(12) United States Patent
Bernardi et al.

(10) Patent No.: US 7,970,518 B2
(45) Date of Patent: Jun. 28, 2011

(54) METHOD AND SYSTEM FOR KEYLESS MACHINE OPERATION

(75) Inventors: John Jay Bernardi, Chillicothe, IL (US); Kevin Dee Ehrenhardt, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 1391 days.

(21) Appl. No.: 11/313,739

(22) Filed: Dec. 22, 2005

(65) Prior Publication Data
US 2007/0150146 A1 Jun. 28, 2007

(51) Int. Cl.
*G06F 7/70* (2006.01)
*G06G 7/00* (2006.01)

(52) U.S. Cl. ............... 701/50; 701/52; 701/53; 307/9.1; 307/19

(58) Field of Classification Search ............ 701/36, 701/50, 52–53; 307/9.1, 85, 40 F, 18–23, 307/109, 38, 80; 290/40 B, 40 C; 363/34–35; 318/139; 320/127
See application file for complete search history.

(56) References Cited

U.S. PATENT DOCUMENTS

| | | |
|---|---|---|
| 3,485,059 A | 12/1969 | Hawks |
| 4,104,688 A | 8/1978 | Pecsi |
| 4,403,675 A | 9/1983 | Cardwell |
| 4,412,137 A | 10/1983 | Hansen et al. |
| 4,596,303 A | 6/1986 | Tremblay |
| 4,754,838 A | 7/1988 | Cody |
| 5,115,145 A | 5/1992 | Westberg et al. |
| 5,175,484 A * | 12/1992 | Witehira et al. ............ 320/125 |
| 5,180,924 A | 1/1993 | Rudisel |
| 5,252,861 A | 10/1993 | Steeby et al. |
| 5,640,072 A | 6/1997 | Miyazaki et al. |
| 5,670,831 A | 9/1997 | Georgiades |
| 5,860,488 A | 1/1999 | Kim |
| 5,990,800 A | 11/1999 | Tamaki et al. |
| 6,007,159 A | 12/1999 | Davis et al. |
| 6,034,617 A | 3/2000 | Luebke et al. |
| 6,234,586 B1 | 5/2001 | Davis et al. |
| 6,239,513 B1 * | 5/2001 | Dean et al. ............ 307/64 |
| 6,329,724 B1 | 12/2001 | Shaklik et al. |

(Continued)

FOREIGN PATENT DOCUMENTS
AU 2003272538 A1 * 6/2004

(Continued)

OTHER PUBLICATIONS

The use of physical model simulation to emulate an AGV material handling system; Hurley, R.; Coffman, P.; Dixon, J.; Walacavage, J.; Robotics and Automation. Proceedings. 1987 IEEE International Conference on; vol. 4, Mar. 1987 pp. 1040-1045.*

(Continued)

*Primary Examiner* — Cuong H Nguyen
(74) *Attorney, Agent, or Firm* — Finnegan, Henderson, Farabow, Garrett & Dunner LLP

(57) ABSTRACT

The keyless power system has an ignition system including an ignition switch having an "OFF" position and one or more electrical components associated with a work machine. The keyless power system also has one or more alternate power sources configured to provide electrical power to the one or more electrical components. The keyless power system also has a controller configured to determine a power-level requirement of the one or more electrical components and activate at least one of the one or more alternate power sources to at least partially satisfy the power-level requirement based on whether the ignition switch is in the "OFF" position.

7 Claims, 3 Drawing Sheets

U.S. PATENT DOCUMENTS

| | | | |
|---|---|---|---|
| 6,476,571 B1 * | 11/2002 | Sasaki | 318/139 |
| 6,479,908 B1 | 11/2002 | Utter et al. | |
| 6,507,195 B1 * | 1/2003 | Nonaka | 324/430 |
| 6,522,029 B1 | 2/2003 | Bell et al. | |
| 6,665,802 B1 * | 12/2003 | Ober | 713/320 |
| 6,672,421 B2 | 1/2004 | Larsson et al. | |
| 6,693,535 B2 | 2/2004 | Van Bosch et al. | |
| 6,874,695 B2 * | 4/2005 | Baker et al. | 237/12.3 C |
| 6,900,556 B2 * | 5/2005 | Provanzana et al. | 307/19 |
| 6,963,796 B2 * | 11/2005 | Larson et al. | 701/36 |
| 6,965,818 B2 * | 11/2005 | Koenig et al. | 701/36 |
| 7,286,918 B2 * | 10/2007 | Koenig et al. | 701/36 |
| 7,290,517 B2 * | 11/2007 | Marchand et al. | 123/179.3 |
| 7,305,291 B2 * | 12/2007 | Koenig et al. | 701/36 |
| 7,336,002 B2 * | 2/2008 | Kato et al. | 307/10.6 |
| 7,411,314 B2 * | 8/2008 | Dunstan | 307/64 |
| 2001/0041952 A1 * | 11/2001 | Nada | 701/22 |
| 2002/0002429 A1 * | 1/2002 | Sugimura et al. | 701/29 |
| 2003/0105567 A1 * | 6/2003 | Koenig et al. | 701/36 |
| 2003/0137195 A1 | 7/2003 | Suzuki | |
| 2004/0104280 A1 * | 6/2004 | Baker et al. | 237/12 |
| 2004/0249534 A1 * | 12/2004 | Yamada et al. | 701/36 |
| 2005/0065684 A1 * | 3/2005 | Larson et al. | 701/36 |
| 2006/0052922 A1 * | 3/2006 | Koenig et al. | 701/36 |
| 2006/0080013 A1 * | 4/2006 | Koenig et al. | 701/36 |
| 2006/0268855 A1 * | 11/2006 | Brandt et al. | 370/389 |
| 2007/0000266 A1 * | 1/2007 | McEnaney et al. | 62/228.4 |
| 2007/0022995 A1 * | 2/2007 | Marchand et al. | 123/179.3 |
| 2008/0100258 A1 * | 5/2008 | Ward | 320/101 |
| 2008/0143292 A1 * | 6/2008 | Ward | 320/101 |
| 2008/0179908 A1 * | 7/2008 | Haber | 296/37.6 |
| 2010/0237692 A1 * | 9/2010 | Mlaker | 307/9.1 |

FOREIGN PATENT DOCUMENTS

| | | | |
|---|---|---|---|
| CN | 1948042 A | * | 4/2007 |
| DE | 4321767 A1 | * | 12/1995 |
| DE | 112006001395 T5 | * | 4/2008 |
| JP | 2004-011599 | * | 1/2004 |
| JP | 2006214437 A | * | 8/2006 |
| JP | 2006214438 A | * | 8/2006 |
| KR | 2002080871 A | * | 10/2002 |
| WO | WO 2004050400 A1 | * | 6/2004 |
| WO | PCT/JP2004/001755 | * | 8/2004 |
| WO | WO 2006130263 A1 | * | 12/2006 |
| WO | WO 2007018674 A1 | * | 2/2007 |

OTHER PUBLICATIONS

Multiple Input Governor Control for a Diesel Generating Set; McGowan, D. J.; Morrow, D. D.; Fox, B.; Energy Conversion, IEEE Transaction on; vol. 23, Issue 3, Sep. 2008 pp. 851-859; Digital Object Identifier 10.1109/TEC.2008.918623.*

Application of diesel generation at Hawaiian electric substations for power system support; Barker, P.P.; Bui, B.; Hirayama, A.; Power Engineering Society General Meeting, 2006. IEEE; 0-0 0 p. 7; Digital Object Identifier 10.1109/PES.2006.1709285.*

Analysis of the kinematics of module climbing caterpillar robots; Wei Wang; Yingying Wang; Kun Wang; Houxiang Zhang; Jianwei Zhang; Advanced Intelligent Mechatronics, 2008. AIM 2008. IEEE/ASME International Conference on; Jul. 2-5, 2008 pp. 84-89; Digital Object Identifier 10.1109/AIM.2008.4601639.*

IEEE Standard for Rotating Electric Machinery for Rail and Road Vehicles; IEEE Std Nov. 2000; Digital Object Identifier: 10.1109/IEEESTD.2000.91903; Publication Year: 2000.*

Power management strategy based on game theory for fuel cell hybrid electric vehicles; Gielniak, M.J.et al.; Vehicular Technology Conference, 2004. VTC2004-Fall. 2004 IEEE 60th; vol. 6; Digital Object Identifier: 10.1109/VETECF.2004.1404915; Publication Year: 2004 , pp. 4422-4426 vol. 6.*

Design methodology of a combined battery-ultracapacitor energy storage unit for vehicle power management; Schupbach, R.M.; et al.; Power Electronics Specialist Conference, 2003. PESC '03. 2003 IEEE 34th Annual ; vol. 1, Publication Year: 2003 , pp. 88-93 vol. 1.*

Plug-In Hybrid Electric Vehicles with Full Performance; Sreedhar, V.; Electric and Hybrid Vehicles, 2006. ICEHV '06. IEEE Conference on; Digital Object Identifier: 10.1109/ICEHV.2006.352291;Publication Year: 2006 , pp. 1-2.*

Short and long term energy source technologies for electrically-heated catalysts; Bass, E.A. et al., Energy Conversion Engineering Conference, 1996. IECEC 96. Proceedings of the 31st Intersociety; vol. 3; Digital Object Identifier: 10.1109/IECEC.1996.553394; Publication Year: 1996 , pp. 1905-1912 vol. 3.*

A solution for integrated track and trace in supply chain based on RFID & GPS; He, W. et al.; Emerging Technologies & Factory Automation, 2009. ETFA 2009. IEEE Conference on; Digital Object Identifier: 10.1109/ETFA.2009.5347146; Publication Year: 2009 , pp. 1-6.*

New low cost avionics with INS/GPS for a variety of vehicles; Martin, M.K.; Vause, D.A.; Aerospace and Electronic Systems Magazine, IEEE; vol. 13 , Issue: 11; Digital Object Identifier: 10.1109/62.730633; Publication Year: 1998 , pp. 41-46.*

Superjunction MOS devices—From device development towards system optimization; Kapels, H.; Power Electronics and Applications, 2009. EPE '09. 13th European Conference on; Publication Year: 2009 , pp. 1-7.*

Fault Tolerance-Genetic Algorithm for Grid Task Scheduling using Check Point; Priya, S.B.; Prakash, M.; Dhawan, K.K.; Grid and Cooperative Computing, 2007. GCC 2007. Sixth International Conference on; Digital Object Identifier: 10.1109/GCC.2007.67; Publication Year: 2007 , pp. 676-680.*

Alternating-current-instrument testing equipment ; Arnold, A.H.M.; Proceedings of the IEE—Part II: Power Engineering vol. 101 , Issue: 80; Digital Object Identifier: 10.1049/pi-2.1954.0023; Publication Year: 1954 , pp. 121-131.*

Frequency Coupling Matrix of a Voltage Source; Lehn, P.; Lian, R.; Power Engineering Society General Meeting, 2007. IEEE Digital Object Identifier: 10.1109/PES.2007.386208; Publication Year: 2007 , p. 1.*

Distributed joint power and admission control for ad-hoc and cognitive underlay networks; Mitliagkas, I.; Sidiropoulos, N.D.; Swami, A.; Acoustics Speech and Signal Processing (ICASSP), 2010 IEEE International Conference on; Digital Object Identifier: 10.1109/ICASSP.2010.5496132; Publication Year: 2010 , pp. 3014-3017.*

Joint scheduling and power control for wireless ad-hoc networks; ElBatt, T.; Ephremides, A.; INFOCOM 2002. Twenty-First Annual Joint Conference of the IEEE Computer and Communications Societies. Proceedings. IEEE; vol. 2 Digital Object Identifier: 10.1109/INFOCOM.2002.1019345; Publication Year: 2002 , pp. 976-984 vol. 2.*

Performance analysis of static versus ARNO converter in Rail AC locomotives; Dhunna, G.S.; Dhingra, A.; Kumar, N.; Electric Power Conference, 2008. EPEC 2008. IEEE Canada; Digital Object Identifier: 10.1109/EPC.2008.4763314 Publication Year: 2008 , pp. 1-5.*

* cited by examiner

METHOD AND SYSTEM FOR KEYLESS MACHINE OPERATION

TECHNICAL FIELD

The present disclosure is directed to a method and system for keyless work machine operation, and more particularly, to a method and system for keyless control of one or more alternate power sources.

BACKGROUND

Conventional start-up systems may require an ignition key in the ignition switch to maintain the operation of a work machine and/or electrical components of a work machine. Work machines may include trucks, recreational vehicles, earth-moving equipment or any other type of machine. A work machine operator may desire to leave one or more electrical components of the work machine operating while away from the work machine. However, maintaining operation of an electrical component may require an ignition key in the ignition switch. Therefore, an operator may be confronted with two options, either leave the key in the ignition switch to operate the electrical system and create a security risk, or remove the key to secure the work machine but disable the electrical system. For example, an operator may leave a work machine for a period of time and desire continual operation of a heating ventilation air conditioning (HVAC) system to maintain a suitable climate in the work machine. The operator may choose to leave a key in the ignition switch and continue HVAC operation, but create a security risk by leaving the key in the work machine. Alternatively, the operator may remove the key from the ignition and avoid a security risk, but discontinue HVAC operation and create an undesirable climate in the work machine.

Work machines have traditionally been powered by a main power unit. The main power unit may supply power to drive and operate the work machine and may include a generator or similar device to power the electrical components of the work machine. A work machine may also include one or more alternate power sources to provide electrical power to the electrical components of the work machine. Alternate power sources may include auxiliary motors, sources of electrical power, fuel-cells, and other devices capable of providing electrical power to a work machine. Other sources of electrical power may include a utility grid connected to the work machine to provide electrical power to the electrical components.

Keyless start-up systems have been developed to provide keyless operation of work machines. One such device is described in U.S. Patent Publication No. 2003/0137195 ("the '195 publication"), to Suzuki, published Jul. 24, 2003. The '195 publication describes a keyless engine controlling unit. The controlling unit includes means to detect and control engine operation. The operator may remove a key from the ignition and lock the vehicle door while leaving the engine of the vehicle in a "running state". The vehicle may be operated as usual when the engine is in the running state. However, a security system prevents unauthorized driving of the vehicle. The controlling unit may also allow remote starting of the engine from outside the vehicle.

Although the keyless start-up system described in the '195 publication may allow keyless operation of certain vehicle functions, the controlling unit is not configured to detect and control more than one engine. Thus, the keyless system of the '195 publication may be incapable of providing keyless operation of one or more alternate power sources associated with the vehicle. Further, the alternate power sources may be more efficient than the main power source, in certain situations, in powering the vehicle's electrical components. For example, the power requirements of HVAC operation may be met by an auxiliary engine providing less power than the main engine. Powering electrical components with an alternate power source that produces less power than the main engine may reduce main engine wear and increase fuel efficiency by operating alternate power sources closer to optimal conditions.

The keyless power system of the present disclosure is directed towards overcoming one or more of the problems set forth above.

SUMMARY OF THE INVENTION

One aspect of the present disclosure is directed to a keyless power system of a work machine. The keyless power system includes an ignition system including an ignition switch having an "OFF" position and one or more electrical components associated with the work machine. The keyless power system also includes one or more alternate power sources configured to provide electrical power to the one or more electrical components. The keyless power system also includes a controller configured to determine a power-level requirement of the one or more electrical components and activate at least one of the one or more alternate power sources to at least partially satisfy the power-level requirement based on whether the ignition switch is in the "OFF" position.

Another aspect of the present disclosure is directed to a method of controlling a work machine. The method includes determining a power-level requirement of one or more electrical components associated with the work machine and determining whether an ignition switch is in an "OFF" position. The method also includes activating at least one of one or more alternate power sources to at least partially satisfy the power-level requirement based on whether the ignition switch is in the "OFF" position.

DETAILED DESCRIPTION

Figure 1:
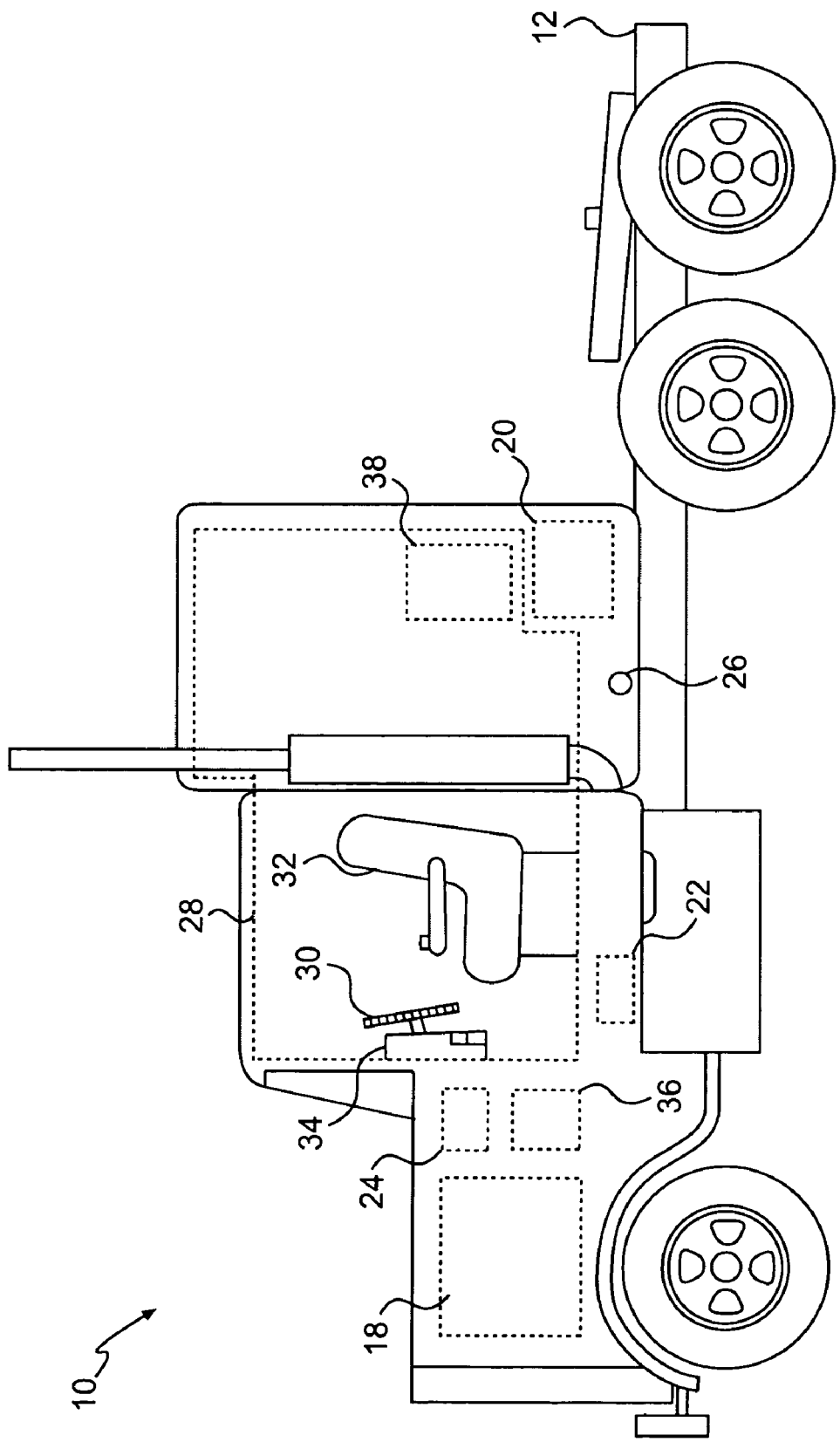
FIG. 1 is a diagrammatic illustration of a work machine, according to an illustrative embodiment.

FIG. 1 shows a diagrammatic view of a work machine 10 according to an exemplary disclosed embodiment. Work machine 10 may include a frame 12, a main power unit 18, an auxiliary power unit (APU) 20, a battery 22, a generator 24, and an external power source connector 26. Work machine 10 may refer to any type of mobile machine that performs some type of operation associated with a particular industry, such as mining, construction, farming, transportation, etc. Specifically, work machine 10 may include trucks, earth moving vehicles, mining vehicles, farming equipment, and any type of machine that operates in a work environment. Work machine 10 may also include any type of automobile or commercial vehicle.

Work machine 10 may include multiple power sources configured to provide mechanical and/or electrical power to the various components of work machine 10. For example, work machine 10 may include main power unit 18 configured to provide mechanical and/or electrical power. Work machine 10 may also include one or more alternate power sources configured to provide electrical power, such as, for example, battery 22, APU 20, and external power source connector 26 for connecting external sources of electrical power to work machine 10.

Work machine 10 may include a cabin 28 mounted to frame 12. Cabin 28 may contain a steering wheel 30, a seat 32, and a dash board 34. Work machine 10 may include one or more electrical components 16, such as, for example, an HVAC system 36 configured to control the climate within cabin 28. Electrical components 16 may also include for example, a refrigerator 38, lights (not shown), radio (not shown), a cooling system (not shown) or any other type of electrically powered accessories.

Figure 2:
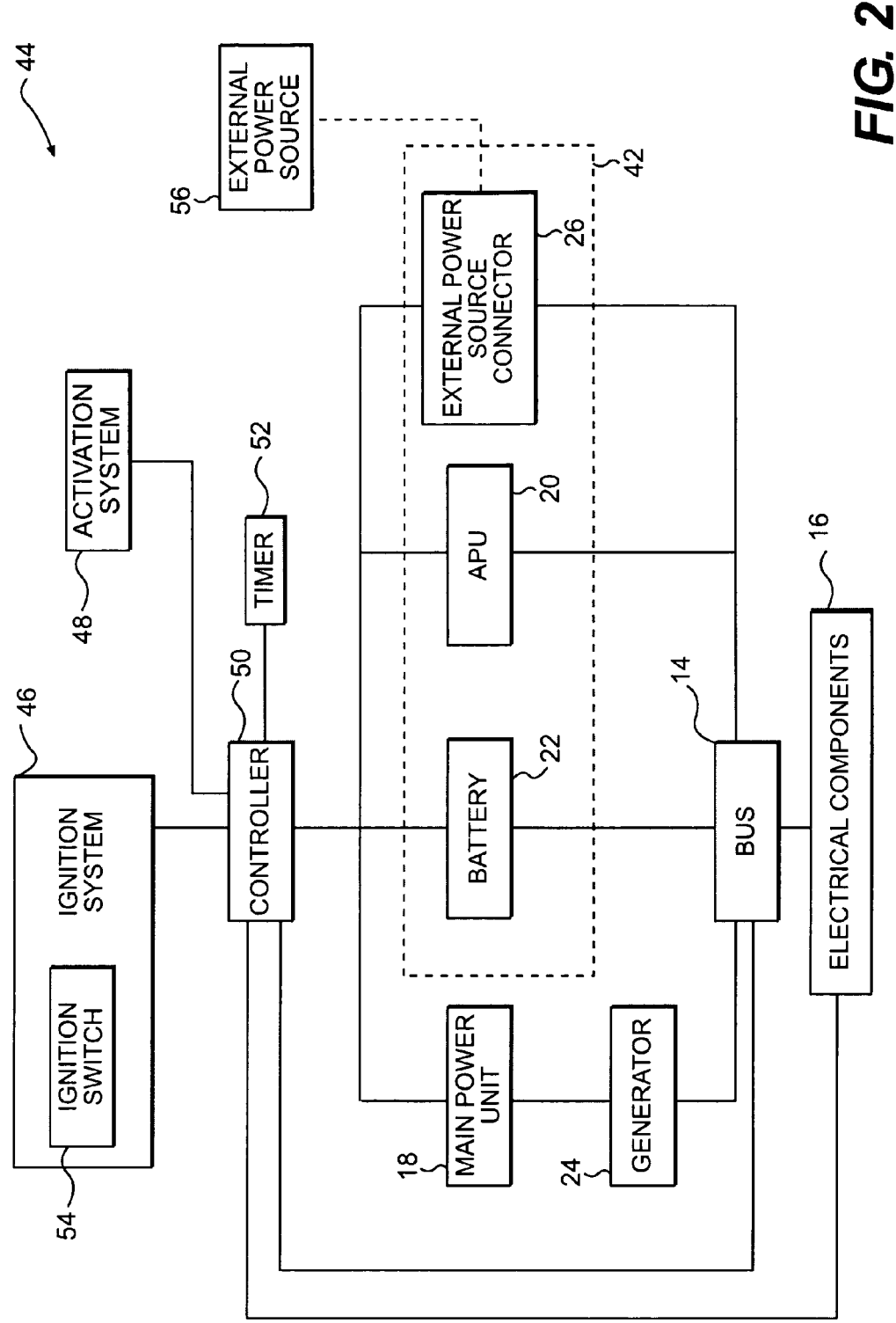
FIG. 2 is a block diagram representation of a keyless power system, according to an illustrative embodiment.

FIG. 2 shows a schematic block diagram representation of an exemplary embodiment of a keyless power system 44. Keyless power system 44 may include several power sources configured to provide electrical power to one or more components of keyless power system 44. For example, power sources may include main power unit 18 and one or more alternate power sources 42. Keyless power system 44 may also include an ignition system 46, an activation system 48, and a controller 50. Based on the status of ignition system 46 and/or activation system 48, controller 50 may activate one or more alternate power sources 42. In an exemplary embodiment, controller 50 may activate alternate power sources 42 without the use of an ignition key.

Main power unit 18 may include an internal combustion engine configured to operate using diesel fuel, gasoline, ethanol, a gaseous fuel such as natural gas, or any other type of fuel. In some embodiments, main power unit 18 may include a fuel-cell, a hybrid engine or other form of power source. Main power unit 18 may be coupled to one or more systems of work machine 10. For example, main power unit 18 may be coupled to a drive system configured to propel work machine 10, a cooling system for cooling other systems of work machine 10, or any mechanical system of work machine 10. Further, main power unit 18 may be coupled to a generator 24 configured to provide electrical power to components of work machine 10.

Keyless power system 44 may include one or more alternate power sources 42 configured to provide electrical power to one or more components of work machine 10. Alternate power sources 42 may include any power source configured to provide electrical power other than main power unit 18. In some embodiments, alternate power sources 42 may include battery 22, APU 20, external power source connector 26 for attaching external sources of electrical power to work machine 10, or any other power source configured to provide electrical power to work machine 10.

Battery 22 may be configured to store electrical energy and provide any desired voltage level. In some embodiments, work machine 10 may include one or more batteries configured to provide different voltage levels, such as, for example, a 288 V high-voltage battery and a 12 V low-voltage battery.

Battery 22 may be operably connected to one or more power sources. To recharge battery 22, other power sources may provide electrical power to battery 22. Battery 22 may also be configured to provide an initial source of electrical power for starting main power unit 18 and/or APU 20.

APU 20 may include an auxiliary engine, such as, for example, an internal combustion engine that may operate using diesel fuel, gasoline, ethanol, a gaseous fuel such as natural gas, or any other type of fuel. APU 20 may also include a generator (not shown) operably connected to the auxiliary engine, wherein the generator may be configured to provide electrical power. It is also contemplated that APU 20 may include a fuel-cell, hybrid engine or other form of power source capable of providing electrical power to work machine 10.

Alternate power sources 42 may include external power source connector 26. External power source connector 26 may include any appropriate electrical receptacle for connecting a bus 14 associated with the electrical system of work machine 10 to an external power source 56. Additionally, external power source connector 26 may include a device to regulate the voltage and/or current of the electrical power supplied by external power source 56. External power source 56 may include any source of electrical power external to work machine 10, such as, for example, a utility grid, a generator, or other suitable source of electrical power.

In operation, alternate power sources 42 may provide a constant power-level or, alternatively, a variable range of electrical power-levels. For example, APU 20 may operate at a single speed and provide an approximately constant range of electrical power. Alternatively, APU 20 may operate at multiple speeds to provide a range of electrical power. Alternate power sources 42 and main power unit 18 may be configured to provide electrical power to bus 14.

Keyless power system 44 may include one or more electrical buses configured to transfer electrical power from one or more power sources to one or more power consumers of work machine 10. For example, bus 14 may be configured to transfer electrical power from generator 24, battery 22, APU 20, and/or external power source connector 26 to one or more electrical components 16 of work machine 10. When main power unit 18 is operational, main power unit 18 may operate generator 24 to provide electrical power to bus 14. When main power unit 18 is shut-down, alternate power sources 42 may provide electrical power to bus 14. It is also contemplated that bus 14 of keyless power system 44 may include separate high and low voltage buses.

Bus 14 may supply electrical power to one or more electrical components 16. Electrical components 16 may include any electrically-powered components of work machine 10, such as, for example, HVAC system 36 (FIG. 1), refrigerator 38 (FIG. 1), lights, displays, wipers, radios, blowers, condensers, electronics, pumps, and heaters. Electrical components 16 may also include electrically-powered equipment associated with work machine 10, such as, for example, a trailer-mounted refrigeration system, hydraulic lift, electric cooking devices and various other electrical devices that may be used in conjunction with work machine 10.

Keyless power system 44 may include ignition system 46 configured to activate and/or shut-down main power unit 18. Ignition system 46 may include a key pad, finger scanner, suitable security system, or any suitable ignition device known in the art. In an exemplary embodiment, ignition system 46 may include an ignition switch 54 configured to receive an ignition key (not shown). Ignition switch 54 may include one or more positions each indicative of an operating mode of work machine 10.

Ignition switch 54 may have four key positions. The first key position can be the "OFF" or "LOCK" position. The ignition key may be inserted or removed from ignition switch 54 when ignition switch 54 is in the "OFF" position. When ignition switch 54 is in the "OFF" position, power from battery 22 may be supplied to low-power electrical components 16, such as, for example, a security system, clock, remote starter, etc.

The second key position of ignition switch 54 can be the "ACCESSORY" position. When ignition switch 54 is in the "ACCESSORY" position, electrical power may be supplied to electrical components 16 requiring power from battery 22 for a temporary time period, such as, for example, audio systems, navigation systems, etc. Long term operation of such electrical components 16 may deplete battery 22 of power if electrical components 16 were to operate continuously without recharging battery 22.

The third key position of ignition switch 54 can be the "ON" or "RUN" position. The "RUN" position may be the position of ignition switch 54 during operation of main power unit 18. Alternatively, when main power unit 18 is not operating and ignition switch 54 is in the "RUN" position, power from battery 22 may be supplied to electrical components 16, such as, for example, driving lights, power inverters, auxiliary lighting, glow plug for diesel engines, etc.

The fourth key position of ignition switch 54 can be the "START" position. The "START" position may be the position of ignition switch 54 used to start main power unit 18. Once main power unit 18 has been started, the position of ignition switch 54 may return to the "RUN" position. It is contemplated that ignition switch 54 may have fewer or more positions and the functions of the positions of ignition switch 54 may be different or modified.

Keyless power system 44 may include activation system 48 configured to activate alternate power sources 42. Activation system 48 may include any system and/or device configured to receive an operator request to activate alternate power sources 42. For example, activation system 48 may include a button, a switch, a dial, a touch-screen, or any other suitable system and/or device known in the art.

Activation system 48 may be located on work machine 10, such as, for example, mounted on dashboard 34. It is also contemplated that activation system 48 may be located remotely from work machine 10. For example, activation system 48 may include a button mounted on an ignition key.

Keyless power system 44 may include controller 50 configured to control an operation of one or more alternate power sources 42. Control may include activation, shut-down, and/or variation of power provided by alternate power sources 42. In some embodiments, controller 50 may control alternate power sources 42 based on ignition system 46, activation system 48, and/or power requirements of electrical components 16.

Controller 50 may include a CPU (not shown) and a storage device (not shown). The CPU may include one or more printed circuit boards, and/or a microprocessor chip. The storage device may be any appropriate type of mass storage provided to store information that the CPU may require in order to perform the operations of controller 50. The CPU may be configured to execute sequences of computer program instructions to perform the operations of keyless power system 44. The computer program instructions may be loaded into random access memory (RAM) for execution by the CPU from read only memory (ROM).

Controller 50 may communicate with main power unit 18, alternate power sources 42, bus 14, or electrical components 16 to collect informational output relating to the current operational characteristics of main power unit 18 and/or alternate power sources 42. The informational output may be transferred to controller 50 using various types of electrical connections. Further, controller 50 may be operably connected to ignition system 46 and/or activation system 48.

In an exemplary embodiment, keyless power system 44 may allow an operator to activate alternate power sources 42 when ignition switch 54 is in the "OFF" position. For example, while ignition switch 54 is in the "OFF" position controller 50 may activate alternate power sources 42 based on a status or electrical condition provided by activation system 48. If ignition switch 54 is not in the "OFF" position, ignition system 46 may operate to activate and/or shut-down main power unit 18 as described previously.

Controller 50 and ignition system 46 may be configured such that controller 50 may determine if ignition switch 54 is in the "OFF" position. In some embodiments, controller 50 may determine the position of ignition switch 54 based on an electrical condition between controller 50 and ignition system 46. The electrical condition may include a voltage, a current, a resistance or any suitable electrical condition. Different positions of ignition switch 54 may correspond to different electrical conditions between controller 50 and ignition system 46. In other embodiments, ignition system 46 may transmit a signal to controller 50 wherein the signal may represent a position of ignition switch 54.

Activation system 48 and controller 50 may be configured to allow an operator to activate alternate power sources 42. Specifically, controller 50 may activate alternate power sources 42 based on an operator request entered into activation system 48. In some embodiments, an operator request entered into activation system 48 may modify an electrical condition between controller 50 and activation system 48. The electrical condition may include a voltage, a current, a resistance, or any other suitable electrical condition. Based on the modified electrical condition, controller 50 may activate alternate power sources 42. In other embodiments, activation system 48 may transmit a signal to controller 50 to activate alternate power sources 42. For example, activation system 48 may be mounted on an ignition key and may transmit a wireless signal to controller 50 to activate alternate power sources 42.

In other embodiments, keyless power system 44 may be configured to automatically activate alternate power sources 42. Keyless power system 44 may include an "automatic mode," wherein alternate power sources 42 may automatically activate following shut-down of main power unit 18.

Various components of keyless power system 44 may be configured to enable automatic activation of alternate power sources 42. For example, activation system 48 may include a switch with an "automatic mode" setting. Following shut-down of main power unit 18, controller 50 may determine if the "automatic mode" setting of activation system 48 is selected. If the "automatic mode" setting of activation system 48 is selected, controller 50 may automatically activate alternate power sources 42. In other embodiments, keyless power system 44 may not require activation system 48. Specifically, controller 50 may be configured to automatically activate alternate power sources 42 following shut-down of main power unit 18.

In some embodiments, keyless power system 44 may activate alternate power sources 42 based on other signals and/or events. For example, controller 50 may monitor a current and/or voltage across external power source connector 26 to determine if external power source 56 is connected. Following connection of external power source 56 to external power source connector 26, controller 50 may permit external power source 56 to supply electrical power to electrical components 16.

Keyless power system 44 may be configured to restrict, or limit, the activation of alternate power sources 42 for security or other reasons. For example, activation of alternate power sources 42 may be restricted to an "activation time window" (ATW). The ATW may include a predetermined time period during which controller 50 may activate alternate power sources 42. Controller 50 may track time based on the output from a timer 52, operably connected to controller 50.

Controller 50 may start the ATW based upon a variety of signals and/or events. For example, the ATW may start upon the shut-down of main power unit 18. The ATW may also start when an ignition key is removed from ignition switch 54 or ignition switch 54 has been moved to a specific position, such as, for example, the "OFF" position. It is also contemplated that the ATW may start based on a change in voltage or current supplied to bus 14 and/or electrical components 16.

Controller 50 may activate alternate power sources 42 if an operator requests activation during the ATW. In some embodiments, following the start of the ATW, controller 50 may establish a loop for the duration of the ATW. During the loop, controller 50 may monitor one or more components of keyless power system 44 to determine if an operator has requested activation. Controller 50 may continue monitoring until the loop terminates. Following loop termination, controller 50 may take no action if an operator requests activation of alternate power sources 42.

To illustrate with an example, controller 50 may be programmed with an ATW of 90 seconds. An operator may shut-down main power unit 18 and controller 50 may then start the ATW. The operator may then activate alternate power sources 42 within 90 seconds following shut-down of main power unit 18. If the operator requests activation during the ATW, such as, for example, within 60 seconds, controller 50 may activate alternate power sources 42. If the operator requests activation outside the ATW, such as, for example, 120 seconds, controller 50 may take no action.

Controller 50 may be configured determine a power-level requirement of electrical components 16 to verify whether alternate power sources 42 require activation. In particular, controller 50 may be configured to monitor a current, a voltage, or any other suitable power-level parameter of bus 14 and/or electrical components 16.

Keyless power system 44 may be configured to determine the availability of one or more alternate power sources 42. In some embodiments, controller 50 may determine if each alternate power source 42 may provide power to electrical components 16. For example, controller 50 may determine that the charge stored in battery 22 may provide sufficient power to electrical components 16.

Keyless power system 44 may be configured to control alternate power sources 42 in a specific order, or hierarchy. In some embodiments, the hierarchy of alternate power source 42 may be based on a power-level provided by each alternate power source 42. For example, controller 50 may determine a power-level provided by each alternate power source 42 using any suitable technique, such as, using a look-up table of expected power-levels for each alternate power source 42. In other embodiments the hierarchy may be based on criteria other than power-level, such as, for example, fuel efficiency. For example, the hierarchy may order external power source 56 before APU 20 as external power source 56 may require less fuel to operate. Both APU 20 and external power source 56 may be ordered prior to battery 22.

Following the activation of alternate power sources 42, various components of keyless power system 44 may be configured to monitor the power-level provided by alternate power sources 42 and the power-level requirements of electrical components 16. In some embodiments, controller 50 may monitor the power-levels using any methods previously described. Based on the monitored power-levels, controller 50 may determine if the power-level provided by alternate power sources 42 is sufficient to meet the power-level requirements of electrical components 16. If the power-levels are balanced, where the power-level provided is sufficient to meet the power-level requirements, controller 50 may not modify the operation of keyless power system 44. Alternatively, if the power-levels are not balanced, controller 50 may modify the operation of keyless power system 44.

Controller 50 may activate, shut-down and/or vary the power-level provided by alternate power sources 42 if the power-level provided by alternate power sources 42 and the power-level requirements of electrical components 16 are not balanced. For example, controller 50 may activate additional alternate power sources 42 if the power provided by alternate power sources 42 is not sufficient to power electrical components 16. Alternatively, controller 50 may shut-down one or more alternate power sources 42 if the power provided by the one or more alternate power sources 42 is no longer required. In addition, controller 50 may vary the power-level provided by alternate power sources 42. For example, controller 50 may vary the speed of APU 20 to vary the power-level provided by APU 20 until balanced with the power-level requirements of electrical components 16.

Controller 50 may also be configured to monitor the position of ignition switch 54 while one or more alternate power sources 42 are operating. In some embodiments, while the position of the ignition switch 54 remains in the "OFF" position controller 50 may continue to monitor and balance the power-levels. If the position of ignition switch 54 is moved from the "OFF" position, controller 50 may reset keyless power system 44.

Keyless power system 44 may be reset at various stages of operation. Reset may include disabling one or more components of keyless power system 44, such as, for example, controller 50 or alternate power sources 42. In some embodiments, keyless power system 44 may be reset when an operator fails to activate alternate power sources 42 within an ATW. Keyless power system 44 may also be reset if electrical components 16 do not require power from alternate power sources 42, zero alternate power sources 42 are available for activation, or ignition switch 54 is moved from the "OFF" position while alternate power sources 42 are operating.

It is contemplated that work machine 10 and/or keyless power system 44 may include additional, fewer, and/or different components than listed above. It is understood that the type and number of listed devices are exemplary only and not intended to be limiting.

INDUSTRIAL APPLICABILITY

Figure 3:
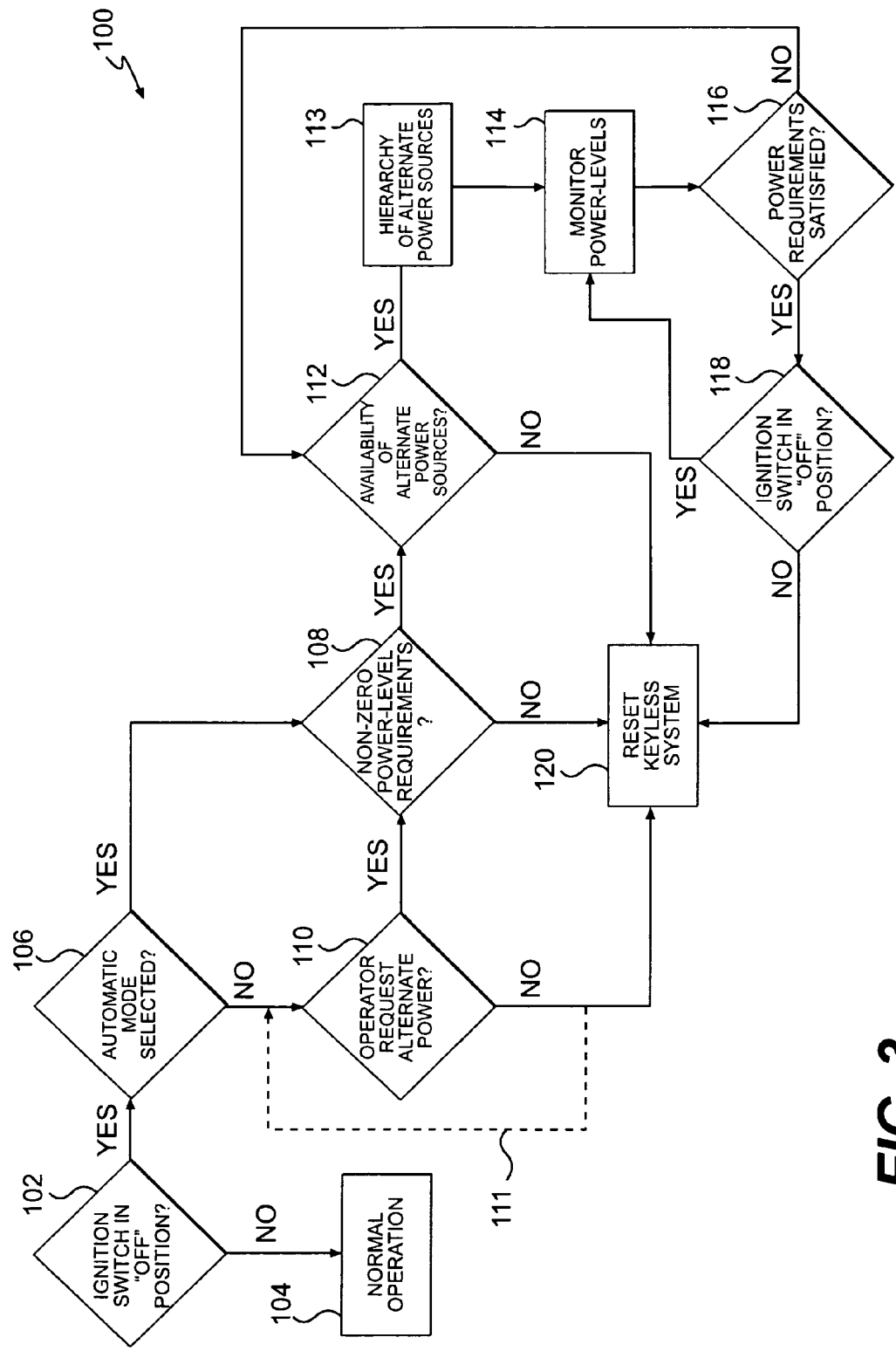
FIG. 3 is an operational flow diagram of a keyless power system, according to an illustrative embodiment.

Keyless power system 44 may be configured to operate with any work machine 10 where it may be advantageous to supply electrical components 16 with power following shut-down of main power unit 18. In an illustrative embodiment as shown in FIG. 3, an operational flow chart 100 of keyless power system 44 is depicted. As shown, keyless power system 44 may activate alternate power sources 42 without the use of an ignition key. Specifically, if ignition switch 54 is in the "OFF" position, controller 50 may activate alternate power sources 42 to provide power to electrical components 16.

Initially, keyless power system 44 may determine if ignition switch 54 is in the "OFF" position (step 102). If ignition switch 54 is not in the "OFF" position, ignition switch 54 may function under "normal operation" (step 104), as described previously. For example, an operator may start main power unit 18 by turning ignition switch 54 to the "START" position.

If ignition switch 54 is in the "OFF" position, keyless power system 44 may determine if an automatic mode is selected (step 106). As described previously, keyless power system 44 may be configured to automatically activate alternate power sources 42 following shut-down of main power unit 18. If keyless power system 44 is configured to automatically activate alternate power sources 42, keyless power system 44 may then determine the power-level requirements of electrical components 16 (step 108).

If keyless power system 44 does not include an automatic mode, or the automatic mode is not selected, step 106 may be bypassed and keyless power system 44 may determine if an operator has requested activation of alternate power sources 42 (step 110). As noted above, controller 50 may monitor an operator request to activate alternate power sources 42 for a defined time period, or ATW. Controller 50 may establish a loop 111 for the duration of the ATW. While loop 111 runs, controller 50 may determine whether an operator has requested activation of alternate power sources 42 as previously described. For example, an operator may request activation using activation system 48 or may connect external power source 56 to external power source connector 26.

If an operator activates alternate power sources 42 during the ATW, keyless power system 44 may then determine the power-level requirements of electrical components 16 (step 108). If an operator does not activate alternate power sources 42 during the ATW, keyless power system 44 may then reset (step 120). For example, controller 50 may no longer accept input from activation system 48.

Following an automated (step 106) or operator (step 110) request to activate alternate power sources 42, keyless power system 44 may determine the power-level requirements of electrical components 16 (step 108). In some embodiments, controller 50 may determine a voltage, a current or other power-level parameter of electrical components 16. If electrical components 16 do not require power from alternate power sources 42, keyless power system 44 may reset (step 120), as described above. Alternatively, if electrical components 16 require power from alternate power sources 42, keyless power system 44 may determine the availability of one or more alternate power sources 42 (step 112).

Controller 50 may determine if one or more alternate power sources 42 are available to provide power to electrical components 16. If no alternate power sources 42 are available, keyless power system 44 may reset (step 120). If alternate power sources 42 are available, keyless power system 44 may activate the one or more available alternate power sources 42 based on a hierarchy (step 113). As noted above, the hierarchy may be based on various criteria, such as, for example, the power-level provided or fuel efficiency of each alternate power source 42. In some embodiments, controller 50 may activate one or more alternate power sources 42 based on their order in the hierarchy.

Following the activation of alternate power sources 42 by hierarchy (step 113), keyless power system 44 may monitor the power-level requirements of electrical components 16 and the power-level provided by alternate power sources 42 (step 114). In some embodiments, controller 50 may monitor the power-levels as described previously. Controller 50 may also determine if alternate power sources 42 are providing sufficient power to satisfy the power requirements of electrical components 16 (step 116).

If the power-level supplied to electrical components 16 is too low, keyless power system 44 may determine the availability of additional alternate power sources 42 (step 112). If additional alternate power sources 42 are available, keyless power system 44 may repeat steps 113 and 114 until the power requirements of are satisfied. Alternatively, if the power-level supplied to electrical components 16 is too high, keyless power system 44 may shut-down one or more alternate power sources 42 based on availability (112) and/or hierarchy (step 113). It is also contemplated that keyless power system 44 may vary the power-level provided by alternate power sources 42 to satisfy the power requirements of electrical components 16, as described above.

If the power requirements of electrical components 16 are satisfied (step 116), keyless power system 44 may monitor the position of ignition switch 54. Specifically, controller 50 may determine if ignition switch 54 is in the "OFF" position (step 118). If ignition switch 54 remains in the "OFF" position, keyless power system 44 may continue to monitor power-levels (step 114) while the power requirements of electrical components 16 are satisfied (step 116). If ignition switch 54 is moved from the "OFF" position while alternate power sources 42 are operating, keyless power system 44 may reset (step 120). For example, keyless power system 44 may shut-down alternate power sources 42.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A power system for a truck, comprising:
   an ignition system including an ignition switch having an "OFF" position at which an ignition key is removable from the ignition switch;
   one or more electrical components associated with the truck;
   one or more alternate power sources configured to provide electrical power to the one or more electrical components; and
   a controller configured to:
   determine a power-level requirement of the one or more electrical components, with the ignition switch in the "OFF" position and the ignition key removed from the ignition switch, and activate at least one of the one or more alternate power sources to satisfy the power-level requirement, with the ignition switch in the "OFF" position and the ignition key removed from the ignition switch, wherein the controller is further configured to shut-down at least one of the one or more alternate power sources based on the power-level requirement of the one or more electrical components.

2. The power system of claim 1, wherein activation of the at least one of the one or more alternate power sources is further based on an operator request.

3. The power system of claim 2, wherein the operator request includes at least one of a manual input and an automatic mode input.

4. The power system of claim 1, wherein the controller is further configured to determine the availability of the one or more alternate power sources to provide electrical power to the one or more electrical components.

5. The power system of claim 1, wherein the controller is further configured to activate the one or more alternate power sources based on a hierarchy.

6. The power system of claim 1, wherein the one or more electrical components includes at least one of an HVAC system, a refrigerator, a light, and a cooling system component.

7. The power system of claim 1, wherein the one or more alternate power sources includes at least one of a battery, an auxiliary power unit, and a connector configured to receive power from external power source.

* * * * *